United States Patent Office 3,412,043
Patented Nov. 19, 1968

3,412,043

ELECTRICALLY CONDUCTIVE RESINOUS COMPOSITIONS

James R. Gilliland, Olean, N.Y., assignor to The Dexter Corporation, a corporation of Connecticut No Drawing. Filed Aug. 5, 1966, Ser. No. 570,397
10 Claims. (Cl. 252—514)

ABSTRACT OF THE DISCLOSURE

An electrically conductive resinous composition consisting essentially of silver flake, resinous binder, and finely divided inert filler having a particle size below about 420 microns, the proportion by weight of silver to binder being in the range of 0.6:1 to 2:1, said composition containing about 0.3 to 2 parts by weight of said inert filler for each part by weight of combined silver flake and binder, and the particle size of said silver flake being substantially less than the particle size of said filler. The inert filler can be either inorganic or organic in nature; and the composition can contain from 0 to 70% by weight of compatible solvent to adopt the viscosity to different adhesive and coating uses.

Silver base lacquers and cements for use in various electrical assemblages have long been known in the art. Rapid advancements in the electronic field has considerably expanded the need for such compositions as indicated in an article by Kelduff and Benderly entitled "Conductive Adhesive for Electronic Applications" which appeared in the June 1958 issue of Electrical Manufacturing. The compositions described in this publication contain 60 to 70% by weight of silver and 30 to 40% of resin (or modified resin). In August 1958 U.S. Patent No. 2,849,631 was issued to K. R. Matz disclosing conductive cements containing 40 to 75%, and preferably about 47 to 53% by weight of silver flake, and stressing the importance of small particle size, i.e. not exceeding 65 microns, and preferably below 10 microns, for the silver flake. Even with this somewhat reduced range for the silver content such conductive cements are inherently so costly as to curtail their more extensive commercial use.

The Matz patent indicates that with a composition containing 60% silver flake and 36% epoxy resin and 4% catalyst, small amounts of filler, i.e. up to about 12% of finely divided quartz, can be included by correspondingly reducing the amount of resin. An example of such modified composition contains 60% silver flake, 25.2% epoxy resin, 2.8% catalyst and 12% quartz. The cost advantage of this use of filler is marginal, the primary purpose being to improve thermal stability. Mention is made in this patent of compositions containing as little as 30% silver, but this is only in connection with compositions which might contain as much as 20% catalyst, and the disclosure is devoid of any illustrative example of such a composition.

An approach to lower cost of conductive cements in the past has involved the use of copper powder with an electrolytically deposited coating of silver, as a conductive ingredient. Such cements are rather unreliable, however, due to a tendency toward electrolytic corrosion when used to bond substrates such as aluminum.

It has now been discovered, in accordance with the present invention, that conductive cements and coatings can be prepared which have excellent electrical and physical properties by incorporating a substantial amount of inert filler, i.e. up to about 70% in the case of inorganic fillers and 40% in the case of organic fillers, based upon the overall weight of the composition, and in so doing adjusting the proportions of silver so that the silver/ resin ratio is within the range of about 0.6:1 to 2:1. A silver/resin ratio of 0.8:1 to 1:1 is generally preferred when using inorganic filler, with a ratio as low as 0.6:1 being satisfactory when using filler of coarser particle size. A somewhat higher proportion of silver should be used with organic filler, i.e. generally a ratio of 1.2:1 to 2:1 depending on the particle size and density of the organic filler. (In determining these ratios the term "resin" is understood to mean the complete system of resin plus hardener or catalyst.) Thus conductive cements can be prepared containing as little as 15 to 20% by weight of silver and provide physical and electrical properties heretofore thought to require the use of several times as much silver. As the cost of a conductive cement or coating is almost directly proportional to the quantity of silver contained therein, the economic importance of this discovery is readily apparent.

The ability to thus include substantial amounts of inert filler and greatly reduced the silver content applies generally to resin systems or binders conventionally used in conductive cements and coatings, including phenolic resin, polyester resin and epoxy resin systems. Selection of resin system or binder for various end use products will depend on a number of factors such as mechanical strength or electrical characteristics desired and compatability with intended substrates. In end use products where a combination of high mechanical strength and high electrical conductivity are of primary importance, epoxy resin systems appear to be preferred binders for use in the improved cements and coatings.

The silver component of the improved cements and coatings is preferably in the form of finely divided silver flake, suitably with a maximum flake dimension not exceeding about 65 microns. It appears that the flakes tend to collect at the surfaces of and coat the particles of inert filler, and that for best conductivity the maximum flake dimension should be substantially smaller than the particle size of the filler. Thus with a very coarse (420 micron) filler the maximum flake dimension might be somewhat greater than 65 microns, while with a finer (<44 micron) filler the maximum flake dimension should preferably not exceed about 10 microns.

The preparation of silver flake requires the use of a lubricant such as oleic acid to prevent cold welding of the metal. Individual flakes are intimately coated with traces of such lubricant and are used in this condition in conductive cements. The presence of the lubricant appears to enhance the coating of filler particles by the silver flake as well as the actual silver to silver contact by inhibiting the wetting of the silver by the resinous binder.

With any given silver-resinous binder system having a high proportion of filler the conductivity is influenced primarily by the silver/resin ratio, and in a secondary way by particle size and type of the filler. Particle size of the filler has a measurable effect on cement conductivity, especially at the lower limit (0.8 to 1) of the silver/resin ratio where a cement containing coarse (420 microns) filler is about twice as conductive as one containing a fine (<44 micron) filler. For many intended uses, however, a cement containing 420 micron filler would be impractical due to its inherent coarse consistency; and for conductive coatings of the type to be hereinafter described a very finely divided filler is desirable.

The physical form or shape of the filler particles also has some effect on conductivity with the crystalline or granular forms being somewhat better than plates such as mica or fibers such as asbestos. Any of the minerals and metal oxides conventionally used as resin fillers, and even certain metals such as powdered aluminum, can be employed as fillers in the conductive cements and coatings.

In addition, various finely divided resins and other organic solids which are compatible with the resin system of the cement or coatings can be used as filler, although on a weight basis, as above mentioned, the quantity of organic filler which can be employed is generally substantially less than with the inorganic fillers. This is due in part to the lower density and greater bulk per unit weight of the organic fillers, and possibly also to a greater affinity of the silver flake for the particles of inorganic filler.

For different uses and applications conductive cements may vary in consistency from fairly stiff pastes to viscous liquids. Control of consistency can be effected by selection of a suitably fluid resin system as the binder, addition of a compatible solvent, or a combination of these. In fact there is no real break or transition between liquid conductive cements and conductive coatings, but rather an adjustment of fluidity to a suitable coating consistency by inclusion of an appropriate amount of compatible solvent. What will be suitable consistency will depend on the intended mode of application, i.e. painting, spraying, dipping, printing, etc. Thus the amount of solvent may vary from a trace to as much as 50 to 70% by weight of the finished composition in the case of low viscosity coatings. In controlling viscosity of the improved cements and coatings any of the solvents conventionally used in conductive cements and coatings can be employed including in particular hydrocarbons, ester solvents, alcohols and appropriate mixtures thereof.

In preparing the new compositions the silver flake, filler and the resin component of the binder are mixed together either by hand or mechanically for a brief period, generally about 3 to 5 minutes, during which time the silver flake uniformly coats the filler particles and the coated particles in the resin take on a pastey consistency. The hardener or curing agent is added as a separate component shortly prior to use since a blend of the conductive mixture and hardener will generally have a usable pot life of the order of ½ hour at room temperature.

When using an epoxy resin in the binder an amine curing agent can be employed, but an unmodified amine is somewhat impractical due to the small proportion required as well as their low viscosity and strongly basic nature (tending to shorten the pot life). It is preferable, therefore, to use amine adducts as curing agents, i.e. adducts of oxides or epoxy resins with polyamines. The resin adducts are formed by the reaction of aliphatic polyamines such as ethylene diamine, diethylene triamine, etc. with epoxy resins in such a ratio that there is at least one mol of polyamine for each epoxide group. Suitable epoxy compounds include diglycidyl ether of bisphenol A having an epoxide equivalent weight from 175 to 500. Other resins can be utilized but the Bisphenol A types are completely satisfactory. Adducts of oxides such as ethylene oxide or propylene oxide with polyamines are formed by the reaction of 1.5 mols of the oxide with one mol of the polyamine. Furthermore, the use of an amine-epoxy-adduct as curing agent is found to provide better conductivity in the cured cement. This appears to be due to the fact that unmodified amines enhance the wetting of the conductive particles to form insulated shields which impair conductivity, probably by reacting with the silver flake lubricant to counteract the beneficial effect of such lubricant which was earlier mentioned.

In preparing conductive coatings the steps above described for preparing a cement would be followed and the two components then diluted to desired fluid consistency by addition of appropriate amounts of solvent. Here again the diluted conductive material and the diluted hardener or curing agent would be stored and handled separately and mixed in the appropriate proportions just prior to use.

As a typical guide for preparing conductive cements in accordance with the present invention which have good overall characteristics when considering the factors of performance, handling and cost, cements using epoxy resin type binders may have the following composition.

Part A

| Components | Parts by weight |
|---|---|
| Silver flake of approx. 10 microns size | 15–29 |
| Mineral filler | 46–60 |
| Epoxy resin [1] | 20–25 |

Part B

| Components | |
|---|---|
| Amine-epoxy-adduct [2] | 6–10 |

[1] Suitable epoxy resins include:
(a) Diglycidyl ethers of bisphenol A having an epoxy equivalent weight of 175 to 16,000, i.e. "Epon 828" (Shell Chemical Co.); "Phenoxy PRDA 8080" (Union Carbide Corp.)
(b) Polyglycidyl ethers of phenol-formaldehyde condensation products having an epoxy equivalent weight of 150–200, i.e. "Novolac DEN 438" (Dow Chemical Co.)

[2] Suitable amine-epoxy-adducts include:
(a) Adduct of 2 mols diethylene triamine with 1 mol of a liquid diglycidyl ether of bisphenol A (Equiv. Wt. 175–250)
(b) Adduct of 1 mol diethylene triamine with 1.5 mols of ethylene oxide.
(c) Adduct of 1 mol diethylene triamine with 1.5 mols of propylene oxide.
(d) Similar adduct using other polyfunctional amines such as tetraethylene pentamine.

When the two components are combined the resulting mixture has a pot life of about 30 minutes at 25° C. and can be cured to optimum properties within 24 to 48 hours at 25° C. or about 2 hours at 60° C.

The electrical performance of conductive cements and coatings is compared on the basis of volume resistivity. The test procedure employed for measuring volume reisistivity is as follows:

The components are mixed in the appropriate proportions and the mixed conductive material is paced into a 4.5 mm. I.D. clean glass tube about 3 cm. long being careful to avoid air entrapment, and then subjected to the appropriate cure, i.e. 2 hours at 60° C. or 24 to 48 hours at 25° C. for the composition above described. The length of the packed, cured tube is accurately measured in cm (Lc). Convenient lengths of flexible transparent plastic tubing are slipped over each end of the tube containing conductive cement, the plastic tubes are bent up to form cups and these are filled with mercury using care to avoid trapped air. Heavy copper wires are inserted into the mercury pools and resistance in ohms (Rg) is measured with a Wheatstone bridge. The copper wire leads are then shorted in a mercury pool and their resistance (Rh) is measured with the Wheatstone bridge. With the foregoing measurements and dimensions, volume resistivity is calculated by the following equation:

$$\text{Vol. Res.} = \text{ohm-cm.} = \frac{(Rg - Rh) \times (\text{cross-sectional area in cm.}^2)}{Lc\ (\text{in.-cm.})}$$

The appropriate volume resistivity in conductive cements and coatings can vary considerably depending upon the use for which they are intended. Generally when used in joining together or supplementing components of electric circuits of a load carrying nature, i.e. in which a regular flow of electric current is anticipated, the volume resistivity should be less than about 0.02 ohm-cm., and for special, more critical purposes it may be important to select conductive cements and coatings having a volume resistivity of the order of 0.005 ohm-cm. or lower. On the other hand, in instances where it is intended primarily to provide media which discharge relatively static electric charges, conductive cements and coatings having a volume resistivity greater than 1, and even as high as 50 to 100 ohm-cm. may be pratical.

Another property important in the evaluating of conductive cements and coatings in the tensile strength of the cured composition. This is suitably measured in terms of tensile shear strength in pounds per square inch, p.s.i. (al/al). It is found that the new compositions containing high proportions of inert filler show essentially the same tensile strength as conventional conductive cements which contain no filler, but have a high content of silver or silver coated copper.

The following examples will serve to show typical conductive cements and coatings in accordance with the present invention, and the effect of change in the amount, type and size of filler employed; but it is to be understood that these examples are given by way of illustration and not of limitation.

EXAMPLE I

A number of conductive cements are prepared using silver flake having a maximum particle dimension of about 10 microns and as binder an epoxy resin system consisting of 3 parts by weight of a diglycidyl ether of bisphenol A having an epoxy equivalent weight of 175–190 and 1 part by weight of an amine epoxy adduct made up of 2 mols of diethylene triamine and 1 mol of the above resin. In several of the formulations a filler in the form of silica sand having a particle size <44 microns is included; and the following tabulation shows the compositions in percentage by weight of silver, resin, and filler, if present, in these formulations. Also included in the tabulation is the volume resistivity expressed in ohm-cm. for each of these cement formulations.

| | Percent Silver | Percent Resin | Percent Filler | Vol. Res., ohm-cm. | Silver/Resin Ratio |
|---|---|---|---|---|---|
| System: | | | | | |
| A | 30 | 70 | ---------- | >10,000 | 0.43 |
| B | 35 | 65 | ---------- | 0.90 | 0.54 |
| C | 40 | 60 | ---------- | 0.08 | 0.67 |
| D | 45 | 55 | ---------- | 0.01 | 0.82 |
| E | 50 | 50 | ---------- | 0.007 | 1.00 |
| F | 40 | 40 | 20 | 0.006 | 1.00 |
| G | 33.3 | 33.3 | 33.4 | 0.008 | 1.00 |
| H | 28.0 | 28.0 | 44.0 | 0.005 | 1.00 |
| I | 27 | 27 | 46 | 0.005 | 1.00 |
| J | 22.5 | 27.5 | 50 | 0.01 | 0.82 |
| K | 75 | 25 | ---------- | 0.005 | 3.00 |

In the foregoing tabulation systems F to J all represent conductive cements falling within the present invention with the preferred cements, from the standpoint of minimizing the silver content, being systems H, I, and J. The slight increase in volume resistivity in system J in which the silver/resin ratio is 0.82 is not sufficient to interfere with its effectiveness as a conductive cement, particularly in non-critical situations where the very low, 22.4%, silver content can minimize the cost of cement.

EXAMPLE II

Several conductive cements were prepared using the same resin and silver components as in Example I, System I, but substituting for the silica sand as filler other fillers having a particle size <44 microns illustrative of mineral, metallic, metallic oxide, and organic types. The compositions of these cements together with their volume resistivity are presented in the following tabulation.

| Filler Type | Chemical Composition | Filler, Percent | Silver, Percent | Resin, Percent | Vol. Res., ohm-cm. |
|---|---|---|---|---|---|
| Mineral | Silicon oxide | 46 | 27 | 27 | 0.005 |
| Metallic | Aluminum | 46 | 27 | 27 | 0.01 |
| Metallic oxide | Aluminum oxide | 46 | 27 | 27 | 0.005 |
| Organic | Dechlorane [1] | 23 | 38.5 | 38.5 | 0.005 |

[1] Perchloropentacyclodecane.

EXAMPLE III

To demonstrate the effect of particle shape of filler in the conductive cements, 6 different mineral fillers, having a particle size <44 microns were incorporated in conductive cements using silver and resin components as described in Example I, System I. The following tabulation shows the compositions and volume resistivity for these six cements.

All of these filler types provide a cement with a volume resistivity of 0.01 or less with the exception of Asbestos; and even the volume resistivity of 0.025 is not so high as to prevent the use of Asbestos in systems where a fibrous type filler might provide advantageous physical or handling properties in a cement.

| Particle Shape | Filler Type | Percent Filler | Percent Silver | Percent Resin | Vol. Res., ohm-cm. |
|---|---|---|---|---|---|
| Amorphous | Silica | 46 | 27 | 27 | 0.006 |
| Crystalline | Barytes | 46 | 27 | 27 | 0.006 |
| Plate | Mica | 46 | 27 | 27 | 0.01 |
| Fibrous | Asbestos | 46 | 27 | 27 | 0.025 |
| Acicular | Wollastonite | 46 | 27 | 27 | 0.01 |
| Angular | Silica sand | 46 | 27 | 27 | 0.006 |

EXAMPLE IV

To demonstrate the effect of particle size on conductivity, several cements were prepared using as filler silica sand of different particle size and employing in each instance silver and resin as described in Example I, System J, at the low, 0.82, silver/resin ratio. The following tabulation shows details concerning these cements and their respective volume resistivity.

| Particle Size Microns | Filler, Percent | Silver, Percent | Resin, Percent | Vol. Res., ohm-cm. |
|---|---|---|---|---|
| 420 | 50 | 22.5 | 27.5 | 0.005 |
| 149 | 50 | 22.5 | 27.5 | 0.007 |
| 74 | 50 | 22.5 | 27.5 | 0.009 |
| <44 | 50 | 22.5 | 27.5 | 0.01 |

This data indicates that for maximum conductivity it is preferable to use as large a particle size filler as is compatible with the desired physical properties in a cement, i.e. the relative smoothness desired or coarseness permissible in the cement for the particular use for which it is intended.

EXAMPLE V

To demonstrate the effect of variation in the resin employed in conductive cements, a cement was prepared using silver, epoxy resin, and filler as described in Example I, but with the proportions being 23% silver, 23% resin binder, and 54% filler. Similar cements were then prepared substituting for the 23% epoxy resin an equal weight of (a) Phenolic resin: Phenol-formaldehyde resin prepared by the reaction of .8 mol of formaldehyde with one mol of phenol catalyzed by a trace of oxalic acid, having a phenol functionality of about five and a softening point of 50° C., i.e. "Polyphen 5023" (Reichhold Chemicals, Inc.)

(b) Polyester resin: Malic acid diethylene glycol resin having a molecular weight of about 5000, catalyzed with methyl ethyl ketene peroxide, i.e. "Polylite 32-032" (Reichhold Chemicals, Inc.).

The composition of these cements and their volume resistivity appear in the following tabulation, together with the volume resistivity of control samples of the same 1:1 silver/resin systems without any filler.

| Binder | Percent Binder | Silver/Resin Ratio | Percent Filler | Vol. Res., ohm-cm. | Control Vol. Res., ohm-cm. |
|---|---|---|---|---|---|
| Epoxy | 23 | 1.00 | 54 | 0.005 | 0.007 |
| Phenolic | 23 | 1.00 | 54 | <100.00 | <200.00 |
| Polyester | 23 | 1.00 | 54 | <100.00 | <200.00 |

While the volume resistivity for the cements containing the phenolic and polyester resins is relatively high compared to the cement using the epoxy resin, it is still sufficiently low to permit practical use of these binders in situations, for example, where it may not be appropriate to use epoxy resin. The significant factor is that there is little difference in volume resistivity between the samples and the corresponding controls which contain no filler. All three of the silver binder systems using 23% silver and 77% binder, and containing no filler, show a volume resistivity >10,000 ohm-cm.

EXAMPLE VI

A conventiontional type conductive coating was prepared containing:

25% silver flake, having a particle size <10 microns.

25% resin binder consisting of 9 parts of diglycidyl ether of bisphenol A (Equiv. Wt. 380), and 1 part of a 2:1 adduct of diethylene triamine with said resin.

oleic acid dissolved in methanol. The treated powders were then incorporated in epoxy resin binder as described in Example I at a silver/resin ratio of about 1.00 and these cements, without any filler being added, were tested for volume resistivity with the following results:

| Silver treated percent oleic acid in methanol: | Vol. res. ohm-cm. |
|---|---|
| 0 | 2.0 |
| 1 | 2.96 |
| 2 | .221 |
| 5 | .062 |
| 10 | .035 |

From the foregoing tabulation it is apparent that the silver washed with at least a 5% oleic acid solution is approximately 50 times more conductive in cement composition than the uncoated silver powder.

The foregoing examples show the effect of different variables in a manner to enable those skilled in the cement and coatings art to formulate cements and coatings for different intended uses and applications. As a further guide, however, the following tabulation is presented to illustrate preferred formulations for a number of typical products. In this tabulation the filler in each instance is silica sand of the particle size indicated. The binder is an epoxy resin system consisting of 3 parts by weight of a diglycidyl ether of bisphenol A, having an epoxy equivalent weight of about 190, and 1 part by weight of an adduct of 2 mols diethylene triamine with 1 mol of the foregoing resin as catalyst or hardener. In the coating compositions the solvent employed is indicated in the table, but it is to be understood that other solvents or solvent mixtures can be employed as well.

| Type Product | Silver Flake | | Binder | Filler | | Solvent | |
|---|---|---|---|---|---|---|---|
| | Percent | Size Microns | Percent | Percent | Size Microns | Percent | Type |
| 1. Cement for large connections | 27 | <65 | 27 | 46 | <420 | | |
| 2. Cement for delicate connections | 27 | <10 | 27 | 46 | <44 | | |
| 3. Coating for brushing or dipping | 27 | <65 | 27 | 36 | <200 | 10 | (1) |
| 4. Coating for spraying | 14 | <10 | 14 | 22 | <44 | 50 | (1) |
| 5. Coating for printing | 21 | <10 | 21 | 33 | <44 | 25 | (1) |

[1] Solvent mixtures containing by weight 1 part methyl ethyl ketone, 3 parts toluene, and 6 parts cellosolve acetone.

50% of a solvent mixture containing by weight 1 part methyl ethyl ketone, 3 parts toluene, and 6 parts Cellosolve acetate.

A second conductive coating was prepared using somewhat different amounts of the foregoing components plus a filler in the form of silica sand, having a particle size <44 microns, providing the following composition: 14% silver flake; 14% binder; 50% solvent; and 22% filler.

Both of these compositions show a volume resistivity of approximately 0.001 ohm-cm., indicating that the presence of filler and substantial reduction in the silver content has no adverse effect on conductivity.

The two compositions are quite similar in appearance, with the second composition containing filler being slightly less viscous. In addition to providing coatings having substantially the same conductivity, the second composition containing filler provides a coating having adherence and hardness comparable to that of the conventional type coating.

EXAMPLE VII

It has been mentioned earlier in the disclosure that oleic acid which is inherently present as a lubricant on commercial silver flake appears to have a distinctly beneficial effect on conductivity in the new conductive cements and coatings containing substantial amounts of filler. Since silver flake can not be obtained without the lubricant coating, silver powder having a particle size of about 5-10 microns was coated with various levels of oleic acid by washing the powder in different concentrations of As commercial products for shipment and storage the hardener component of the resin (in the case of the cements) or the hardener component plus the solvent (in the case of the coatings) are packaged separately from a blend of the other components for mixing by the consumer just prior to use. In this way commercial products having unlimited shelf life can provide rapidly curing cements and coatings.

While the coating compositions 3, 4 and 5 in the foregoing tabulation employ as binder a mixture of epoxy resin and hardener, it should be pointed out that in coating compositions it is also possible to employ high molecular weight epoxy resins i.e. those having an epoxy equivalent weight of the order of 5,000 to 16,000 without any hardener, but employing a solvent which readily dissolves the resin such as the solvent mixture above mentioned. The proportions of such modified binder and resin can correspond with the proportions of binder and solvent in items 3, 4 and 5 of the tabulation or the relative amounts of solvent can be varied to suitably modify the viscosity for the intended mode of coating application.

Various changes and modifications in the conductive cements and coating compositions herein disclosed will occur to those skilled in the art and to the extent that such changes and modifications are embraced by the appended claims it is to be understood that they constitute part of the present invention.

I claim:

1. An electrically conductive resinous composition consisting essentially of silver flake, resinous binder, and finely divided inert filler having a particle size below about 420 microns, the proportion by weight of silver to binder being in the range of about 0.6:1 to 2:1, said composition containing about 0.3 to 2 parts by weight of said inert filler for each part by weight of combined silver flake and binder, and the particle size of said silver flake being substantially smaller than the particle size of said filler.

2. An electrically conductive resinous composition as defined in claim 1, wherein the particle size of the silver flake varies from about 65 microns for filler of <420 microns, to about 10 microns for filler of <44 microns.

3. An electrically conductive resinous composition as defined in claim 1, wherein the filler is inorganic in nature, the proportion of silver to resin is about 0.6:1 to 1:1, and said filler is present in the amount of about 0.6 to 2 parts per part by weight of combined silver flake and binder.

4. An electrically conductive resinous composition as defined in claim 1, wherein the filler is organic in nature, the proportion of silver to resin is about 1.2:1 to 2:1, and said filler is present in the amount of about 0.3 to 1.0 parts per part by weight of combined silver flake and binder.

5. An electrically conductive resinous composition as defined in claim 1, wherein the silver flake, binder and filler make up the full composition and said composition is adapted for use as a conductive cement.

6. An electrically conductive resinous composition as defined in claim 1, containing, in addition to the combined weight of said silver flake, binder and filler, a diluent in the form of a compatible solvent in an amount not exceeding about 70% by weight of the diluted composition and said composition is adapted for use as a conductive coating.

7. An electrically conductive resinous composition as defined in claim 1, wherein the resinous binder is an epoxy resin system consisting essentially of a diglycidyl ether of bisphenol A having an epoxy equivalent weight of about 150 to 16,000, and an amine curing agent.

8. An electrically conductive resinous composition as defined in claim 7, wherein the amine curing agent is a polyfunctional amine-epoxy adduct.

9. An electrically conductive resinous composition as defined in claim 6, adapted for use as a conductive coating, wherein the binder is a high molecular weight epoxy resin adapted to form a continuous adherent film upon evaporation of the solvent.

10. An electrically conductive resinous composition as defined in claim 9, wherein the binder is a diglycidyl ether of bisphenol A having an epoxy equivalent weight of about 5,000 to 16,000.

References Cited

UNITED STATES PATENTS

| | | | |
|---|---|---|---|
| 2,470,352 | 5/1949 | Holmes | 260—39 |
| 2,833,664 | 5/1958 | Knapp | 106—287 |
| 2,849,631 | 8/1958 | Matz | 310—249 |
| 2,795,680 | 6/1957 | Peck | 252—514 |
| 2,833,664 | 5/1958 | Knapp | 106—290 |
| 2,864,774 | 12/1958 | Robinson | 252—514 |
| 3,003,975 | 10/1961 | Louis | 252—503 |
| 3,140,342 | 7/1964 | Ehrreich et al. | 174—35 |

FOREIGN PATENTS

| | | |
|---|---|---|
| 596,344 | 3/1960 | Canada. |

OTHER REFERENCES

IBM Technical Disclosure Bulletin, vol. 4, No. 2, July 1961, 2 pages.

LEON D. ROSDOL, *Primary Examiner.*

J. D. WELSH, *Assistant Examiner.*